Oct. 26, 1926.

E. W. SEAHOLM

TRANSMISSION LOCK

Filed Dec. 17, 1919

1,604,241

Inventor
Ernest W. Seaholm
By Attorneys
Blackwood, Spencer & Hicks

Patented Oct. 26, 1926.

1,604,241

UNITED STATES PATENT OFFICE.

ERNEST W. SEAHOLM, OF DETROIT, MICHIGAN.

TRANSMISSION LOCK.

Application filed December 17, 1919. Serial No. 345,563.

The invention relates to transmission locks for motor vehicles and more particularly to mechanism which includes means for locking the gear-shifting devices and also for securing the cover of the gear case against unauthorized removal.

In transmission locks as generally employed it is a comparatively simple operation, involving merely the loosening of a few bolts, to remove the transmission cover together with the locking mechanism, thereby permitting access to and shifting of the gears. It is the object of my invention to render the theft of automobiles more difficult by preventing not only the shifting of the gears by the usual means, but also removal of the cover while the shifting means is locked. With this object in view the invention comprises certain improved locking and cover-securing means and details thereof as hereinafter more fully described and claimed.

Figure 1:
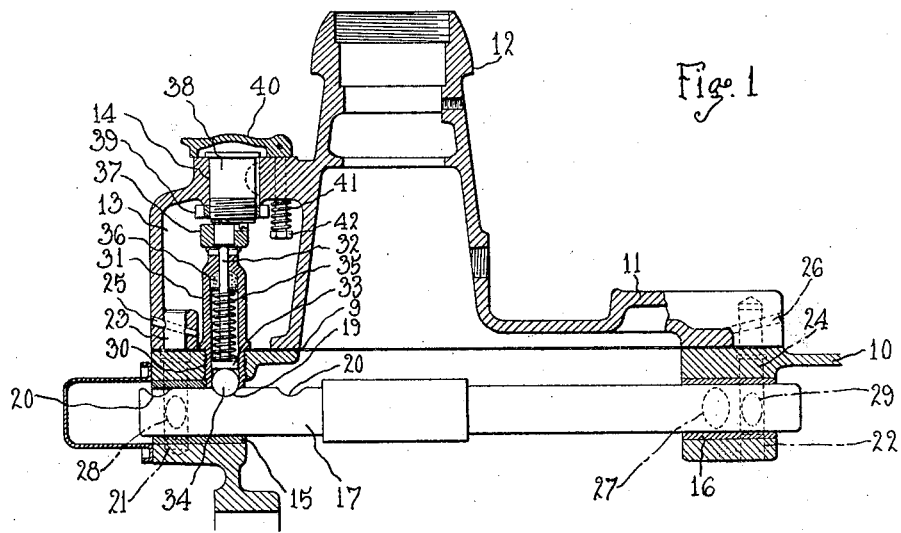
Figure 2:
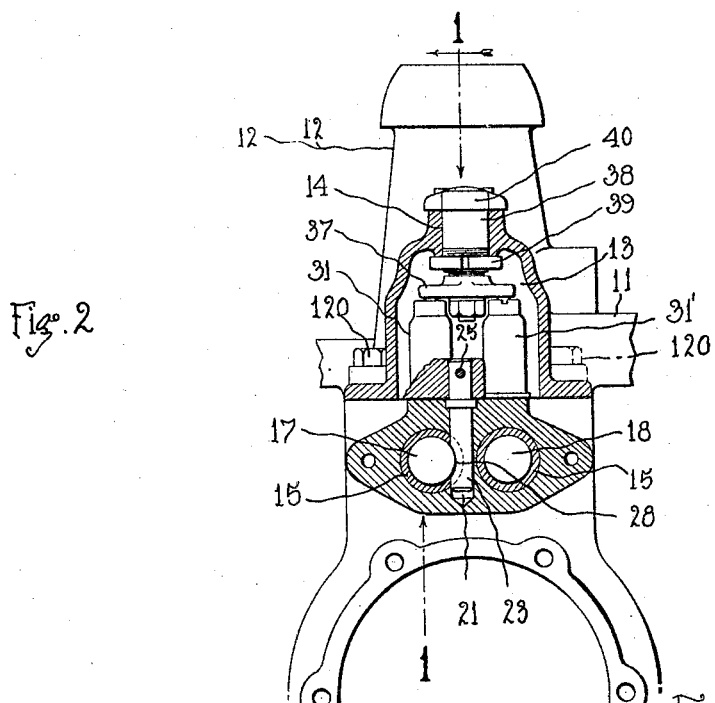

In the accompanying drawing:

Fig. 1 is a sectional elevation on line 1—1 of Fig. 2 showing one embodiment of my invention, and Fig. 2 is an elevation, partly in section, transverse to the view in Fig. 1.

In the drawing is shown a transmission or gear casing 10 and a cover 11 secured to the casing in the usual manner, as by bolts 120, a gasket 9 providing for an oil-tight joint. The cover 11 includes the usual lever-supporting portion 12, and adjacent thereto is shaped to form a chamber 13, having a cylindrical aperture 14 in its top.

In the casing are provided the customary bearings 15, 16 for gear-shifting rods 17, 18, which will be arranged in any usual or desired manner to cause the movement of the gears to various speed-changing positions by longitudinal movement of the rods. Any other form of reciprocating shifting mechanism may, of course, be employed in place of the rods shown. On the upper sides of these rods are notches 19, 20, a plurality of notches being provided in each rod, designed to co-operate with the locking mechanism hereinafter described.

In the casing are drilled or otherwise formed holes 21, 22, adapted to receive pins 23, 24, these pins being secured in holes in the cover, as by tapered keys 25, 26, so that they are incapable of being readily removed from the exterior of the cover. The holes 21, 22, are so positioned as to intersect one side of the bearings for one of the gear-shifting rods, as rod 17, so that the pins 23, 24, would normally be in the path of travel of the rod. In order to provide for the insertion of the pins in the operation of placing the cover in position on the casing the rod 17 may be cut away, as at 27, so that by shifting the rod to some predetermined position other than neutral the pins may be inserted. The pins, on the other hand, are provided with cut away portions 28, 29, so located that when the cover is properly secured to the casing these cut-way portions register with the path of rod 17, the shifting of the rod being thereby permitted.

In a screw-threaded aperture 30 in the top of casing 10 is secured a barrel 31 containing detent mechanism comprising plunger 32 carrying head 33 operating against ball 34 under the resilient action of spring 35. In the upper part of the barrel, is packing 36, and plunger 32 extends through said packing and the upper end of the barrel. A similar barrel and detent mechanism 31′ is arranged to cooperate with the other rod 18.

In the chamber 13 above the barrels 31, 31′, is a locking bar 37, carried by the rotary spindle of a lock 38 of any conventional or desired construction, the lock being secured in the cylindrical aperture 14 by a screw-sleeve or nut 39.

A cap 40 may be provided to cover the lock, said cap being preferably held in either closed or open position by a spring 41 operating upon the pivot of the cap hinge through bolt 42. Any other type of spring hinge may of course be employed.

It will be clear from the relation of the parts as described that the detent mechanism housed within the barrels 31, 31′, will operate ordinarily to retain the rods 17, 18, resiliently in adjusted position provided that the locking bar 37 has been swung to a position parallel to the shifting rods so that reciprocation of the plungers may take place unhindered. If, however, the locking bar be swung to the position shown in the drawing in which its ends will be immediately above the ends of the plungers, it will be seen that the shifting of the rods will be prevented.

If the locking mechanism be so operated as to lock the shifting rods when rod 17 is in neutral position it is obvious that the cover will also be secured against unauthorized removal, since the pins 23, 24, can be removed only when rod 17 is in some other than neutral position.

The mounting of the lock parts in the chamber 13 entirely closed from the interior of the gear casing and secured against entry of oil or grease from said casing by the gasket 9 and packing 36 is an important feature of the invention. Locks so designed as to permit entry of transmission lubricant to the lock parts soon become greasy and sticky, and in some cases the locks have even been rendered inoperable as a result. My construction entirely prevents the access of grease to the parts of the lock proper, and thereby avoids soiling of the key and sticking or gumming of the lock.

It will be understood that the construction may be modified in many details without departing from the spirit or scope of the invention and therefore I do not wish to be limited to the specific structure herein described.

I claim:

1. The combination with a transmission casing of two shifter rods slidable therein, said rods having stops thereon, a spring-actuated plunger associated with each rod and cooperating with the stops thereon to retain the rod yieldably in adjusted position, a locking bar arranged to be moved in a plane transverse to the direction of movement of said plungers and to be positioned either wholly out of the path of said plungers or over the ends thereof to prevent their movement away from said rods, and means for moving said bar and locking the same in the position to prevent movement of said plungers.

2. A transmission casing having bearings therein, a shifter rod slidably supported in said bearings, a barrel mounted upon said casing, a detent slidably mounted in said barrel and spring actuated toward said rod, a cover for said casing adapted to enclose said barrel, and a lock mounted upon said cover and arranged to engage said detent and thereby prevent movement of said rod.

3. A transmission casing having bearings therein, two shifter rods slidably mounted in said bearings and having stops, a barrel mounted on said casing in proximity to each rod, a detent slidably supported in each barrel and arranged to cooperate with the stops on the corresponding rod to retain the rod yieldably in adjusted position, a cover for said casing adapted to enclose said barrels, and a lock carried by said cover and comprising means engageable with both of said detents to prevent movement thereof away from their rod-retaining position.

4. A transmission casing having bearings therein, shifter rods slidably supported in said bearings, said casing being provided with apertures in proximity to said rods, detent mechanism for said rods supported in said apertures and extending outwardly from said casing, a cover for said casing having a recess forming with the top of said casing a chamber sealed from the interior of the casing and enclosing said detent mechanism, and lock mechanism carried by said casing a part of which extends into said chamber in position to engage said detent mechanism.

5. A transmission casing having bearings therein, shifter rods slidably supported in said bearings, detent mechanism supported on said casing adjacent to said rods and adapted to retain them yieldably in adjusted position, a cover for said casing having a passage for entry of a lever for actuating said rods and a chamber on one side of said passage and wholly separated therefrom for enclosing said detent mechanism, and lock mechanism mounted upon said cover having a part extending into said chamber and arranged to lock said detent mechanism.

6. The combination with a gear casing and a cover therefor, said cover comprising a chamber sealed against entry of lubricant from the interior of the casing, a gear shifting mechanism operable within the casing, detent mechanism carried by the casing and extending into said chamber, said detent mechanism including spring-actuated plungers adapted to retain said shifting mechanism in adjusted positions, and locking means housed in part within said chamber and operative upon said detent mechanism.

7. The combination of a gear casing having a bearing and an aperture communicating therewith, a shifter rod slidably mounted in said bearing, a barrel secured in said aperture and extending outwardly from the casing, a spring-actuated detent for said rod mounted in said barrel and comprising a plunger having one end projecting from the outer end of the barrel, a cover for said casing having a chamber adapted to enclose said barrel, and a lock carried by said casing having a locking bar arranged to swing in a plane transverse to the movement of said plunger and to be positioned over the projecting end of said plunger to prevent movement thereof away from said rod.

In testimony whereof I affix my signature.

ERNEST W. SEAHOLM.